(12) United States Patent
Foley et al.

(10) Patent No.: US 8,648,009 B2
(45) Date of Patent: Feb. 11, 2014

(54) METHOD FOR THE SYNTHESIS OF POROUS CARBON MATERIALS

(75) Inventors: Henry C. Foley, University Park, PA (US); Ramakrishnan Rajagopalan, University Park, PA (US); Andrew P. Marencic, Princeton, NJ (US); Christopher L. Burket, Linden, PA (US)

(73) Assignee: The Penn State Research Foundation, University Park, PA (US)

( * ) Notice: Subject to any disclaimer, the term of this patent is extended or adjusted under 35 U.S.C. 154(b) by 857 days.

(21) Appl. No.: 11/740,425

(22) Filed: Apr. 26, 2007

(65) Prior Publication Data

US 2007/0253887 A1    Nov. 1, 2007

Related U.S. Application Data

(60) Provisional application No. 60/795,309, filed on Apr. 27, 2006.

(51) Int. Cl.
| | |
|---|---|
| B01J 21/00 | (2006.01) |
| H01M 4/88 | (2006.01) |
| C01B 31/08 | (2006.01) |
| C01B 31/00 | (2006.01) |
| C01B 31/02 | (2006.01) |
| H01M 4/13 | (2010.01) |
| H01M 4/58 | (2010.01) |

(52) U.S. Cl.
USPC .......... 502/418; 502/262; 502/263; 502/101; 423/445 R; 423/455; 429/218.1; 429/231.8

(58) Field of Classification Search
None
See application file for complete search history.

(56) References Cited

U.S. PATENT DOCUMENTS

| | | | | |
|---|---|---|---|---|
| 3,544,530 | A * | 12/1970 | Shaffer | 526/270 |
| 4,677,095 | A * | 6/1987 | Wan et al. | 502/262 |
| 6,719,147 | B2 * | 4/2004 | Strano et al. | 210/490 |
| 7,601,318 | B2 * | 10/2009 | Armand et al. | 423/306 |
| 2003/0092560 | A1 * | 5/2003 | Von Blucher et al. | 502/10 |
| 2003/0108785 | A1 * | 6/2003 | Wu et al. | 429/44 |
| 2003/0185741 | A1 * | 10/2003 | Matyjaszewski et al. | 423/445 R |
| 2006/0057051 | A1 * | 3/2006 | Dai et al. | 423/445 R |
| 2006/0226569 | A1 * | 10/2006 | Henneck et al. | 264/102 |
| 2007/0015056 | A1 * | 1/2007 | Takei et al. | 429/231.8 |

FOREIGN PATENT DOCUMENTS

WO    WO 2007127900 A2 * 11/2007

OTHER PUBLICATIONS

Kyotani, Takashi; Control of pore structure in carbon; Carbon 38 pp. 269-286 (2000).
Hulicova, Denisa et al.; The polymer blend technique as a method for designing fine carbon materials; Carbon 41; pp. 1443-1450; (2003).

(Continued)

Primary Examiner — Guinever Gregorio
(74) Attorney, Agent, or Firm — Gifford, Krass, Sprinkle, Anderson & Citkowski, P.C.

(57) ABSTRACT

Nanoporous and mesoporous carbon materials are fabricated in a pyrolysis process in which a starting mixture including a carbonizing polymer and a pyrolyzing polymer are employed. In one instance, the carbonizing polymer and pyrolyzing polymer are joined together in the form of a block copolymer. In another instance, the carbonizing polymer is a polyfurfuryl alcohol and the pyrolyzing polymer is polyethylene glycol diacid. These two polymer materials are mixed together and not copolymerized. The pore structure of the material may be controlled by controlling the molecular weight of various of the polymer components.

12 Claims, 1 Drawing Sheet

(56) References Cited

OTHER PUBLICATIONS

Ozaki, J. et al.; Novel preparation method for the production of mesoporous carbon fiber from a polymer blend; Carbon, vol. 35, No. 7; pp. 1031-1033; 1997.

Ryoo, Ryong et al.; Synthesis of Highly Ordered Carbon Molecular Sieves via Template-Mediated Structural Transformation; J Phys Chem B; vol. 103, No. 37; pp. 7743-7746; 1999.

Strano, Michael S, et al; Templated pyrolytic carbon; the effect of poly(ethylene glycol) molecular weight on the pore size distribution of poly(furfuryl alcohol)-derived carbon; Carbon 41 2501-2508 (2003).

Lafyatis, et al., Poly(furturyl alcohol)-Derived Carbon Molecular Sieves: Dependence of Adsorptive Properties on Carbonization Temperature, Time, and Poly(ethylene glycool) Additives, Ind. Eng. Chem. Res. 1991; 30: 865-873.

* cited by examiner

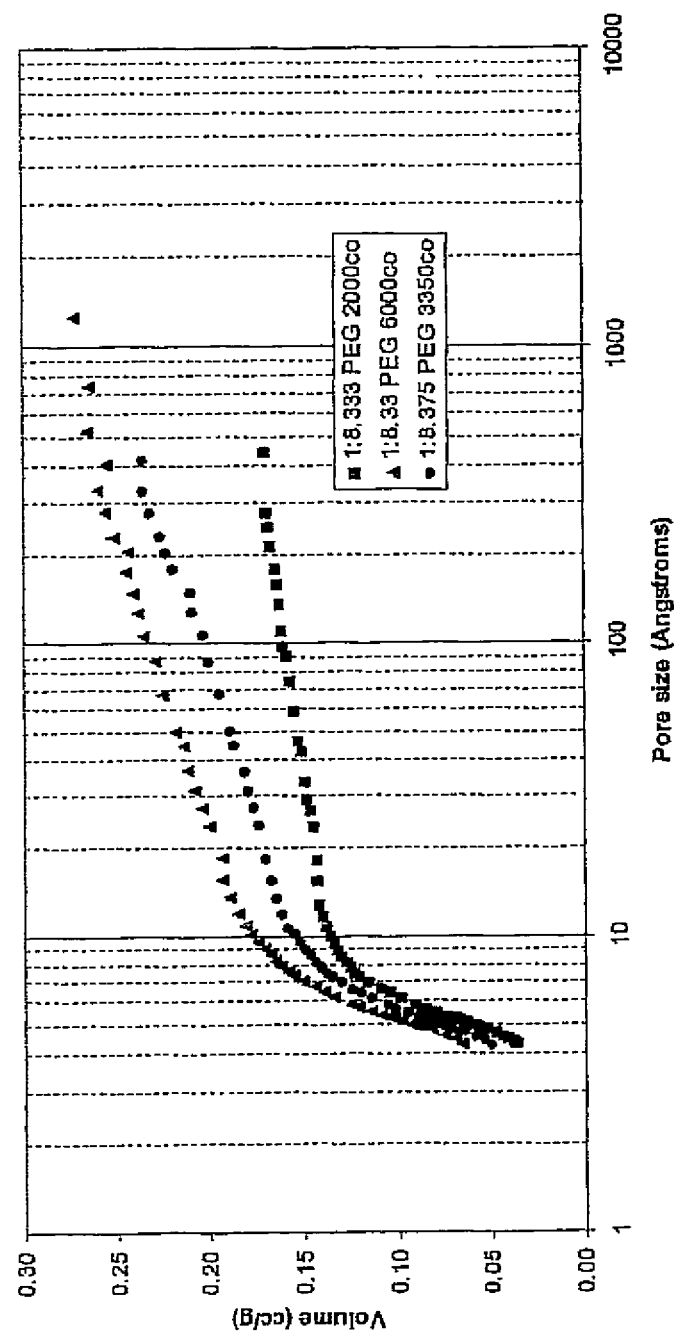

METHOD FOR THE SYNTHESIS OF POROUS CARBON MATERIALS

CROSS-REFERENCE TO RELATED APPLICATIONS

This application claims priority of U.S. Provisional Patent Application Ser. No. 60/795,309 filed Apr. 27, 2006, entitled "A Method for the Synthesis of Porous Carbon Materials."

STATEMENT OF GOVERNMENT SUPPORT

This invention was made with government support under Grant No. DMR0103585, awarded by the National Science Foundation. The Government has certain rights in the invention.

FIELD OF THE INVENTION

This invention relates generally to materials. More specifically, the invention relates to porous carbon materials. Most specifically, the invention relates to a method for the fabrication of mesoporous carbon with tunable porosity.

BACKGROUND OF THE INVENTION

Porous carbon materials have a variety of uses; for example they may be used: as electrodes for ultracapacitors, batteries, fuel cells and the like; as catalysts; as adsorbents; and as chemical reagents, among others. It is often necessary that the pore size of the carbon be controlled so as to optimize the properties of the material for particular applications.

A variety of techniques have been developed in the prior art for the preparation of porous carbon materials, and many of these methods involve the pyrolysis of a starting material. As is used herein, pyrolysis is understood to mean a chemical reaction brought about by heating which may comprise partial or complete degradation of a material wherein at least a portion of the material is converted to carbon. The prior art has developed a number of processes relying upon the use of different starting materials and different heating profiles to produce porous carbon materials via a pyrolysis reaction.

A number of approaches have been implemented in the prior art for the fabrication of porous carbon materials. In one approach, a starting mixture of carbonaceous materials such as natural or synthetic polymers, together with admixed metal particles such as Fe, Ni, and Co, is pyrolyzed. In the pyrolysis process, the metal particles activate the formation of mesopores. This method results in the production of a material which includes the metal particles. The presence of these particles is not always desirable, and removal of the particles is difficult. In other processes, carbonization of a precursor material takes place in the presence of a pore-forming template such as mesoporous silica. This process requires the use of highly corrosive acids such as hydrofluoric acid for the removal of the silica template. It has also been suggested in the prior art that various polymer blends can be pyrolyzed to produce porous carbons. However, such processes have heretofore been of limited utility since the geometry of the pore structure depends on the extent of reaction induced phase separation of the polymers, which is very difficult to control and predict.

As will be explained hereinbelow, the present invention is directed to simple to implement methods and materials for directly producing porous carbon via pyrolysis reactions. According to the methods of the present invention, the properties of the porous carbon may be selectably controlled by proper selection and control of the starting materials. Accordingly, the present invention may be employed to synthesize porous carbon materials having a very narrowly defined and precisely selected range of pore sizes.

BRIEF DESCRIPTION OF THE INVENTION

A carbon-based material having a controlled pore structure is fabricated by a method wherein a starting material is pyrolyzed so as to cause it to undergo a reaction induced phase separation which produces a porous carbon material. The starting material may comprise a block copolymer comprised of a first polymeric material which is a carbonizing polymer and a second polymeric material which is a pyrolyzing polymer. Alternatively, the starting material may comprise a mixture of a polyfurfuryl alcohol and polyethylene glycol diacid.

In the block copolymer, the carbonizing polymer may be a polyfurfuryl alcohol, and in some instances, the pyrolyzing polymer may be a polyethylene glycol, which in particular instances may comprise polyethylene glycol diacid. In yet other instances, the block copolymer may include at least one material from the group comprising polyvinylidene fluoride and/or a carbohydrate. The polyethylene glycol in either embodiment may, in some instances, have a molecular weight in the range of 1000 to 10,000.

The step of pyrolyzing may comprise heating the starting material at a temperature in the range of 500° C. to 1000° C. for a period of time ranging from five to twenty hours. In particular instances, the heating is carried out in a stepwise manner wherein the starting material is slowly heated to a temperature of 200° C. over about a one hour time period, then raised to a temperature of 800° C. over a period of about four hours, and then maintained at 800° C. for approximately eight hours. The step of pyrolyzing may be carried out in an inert atmosphere. In some instances, the porous carbon material is further activated, as for example by heating. In particular instances, such activation is carried out by heating the porous carbon material in a non-oxidizing atmosphere, such as an inert atmosphere, or an atmosphere which includes carbon dioxide.

Also disclosed are materials made by these methods.

BRIEF DESCRIPTION OF THE DRAWINGS

FIG. 1 is a graph depicting how, in one embodiment of the invention, pore size and pore volume of a carbon material may be controlled by controlling the composition of a pyrolysis mixture.

DETAILED DESCRIPTION OF THE PREFERRED EMBODIMENTS

According to the method of the present invention, porous carbon materials are fabricated by pyrolysis of a starting material which, in one instance, may be a block copolymer comprised of a first polymeric material which is a carbonizing polymer and a second polymeric material which is pyrolyzing polymer. As is understood herein, a carbonizing polymer, upon pyrolysis, produces a carbon deposit, whereas a pyrolyzing polymer dissipates to a significant degree; although, it can also in and of itself provide some carbon deposit. Interaction between the members of the block copolymer produces a porous carbon deposit, and the properties of this deposit in terms of porosity may be controlled by controlling the relative amounts and molecular weights of the components of the block copolymer. A number of carbonizing and pyrolyzing polymers are known in the art, and such materials may be incorporated into block copolymers for use in the present process.

One particular group of copolymers having utility in the present invention comprises block copolymers of a polyfurfuryl alcohol and a polyethylene glycol wherein the polymer blocks are covalently bonded by the formation of an ester linkage. In such instance, the polyfurfuryl alcohol is the carbonizing polymer and the polyethylene glycol diacid is the pyrolyzing polymer. The polyfurfuryl alcohol component may comprise unsubstituted as well as substituted polyfurfuryl alcohols. The polyethylene glycol may also be variously substituted; and one particular polyethylene glycol comprises polyethylene glycol diacid. The pore sizes of the carbon produced by this material can be tuned by changing the chain length of the pyrolyzing polymer.

In one synthetic procedure, the block copolymer is prepared as follows: Part 1—synthesis of polyethylene glycol diacid: 10 mmol of PEG (molecular weights 1000, 2000, 3350 and 6000 g/mol), 50 mmol succinic anhydride, and 50 mmol of pyridine (all from Aldrich Chemical) were mixed in chloroform for 48 hours at 55° C. The reacted solution was then evaporated and redissolved in a 10% sodium bicarbonate solution and filtered to remove residue. The filtered mixture was then chilled to temperatures in the range of 0° C.--5° C. and acidified using 0.3 mol of hydrochloric acid. The product was then extracted using chloroform and recrystallized from diethyl ether.

Part 2—synthesis of the block copolymer: 0.68 g of dicyclohexylcarbodiimide (Aldrich Chemical) was added to 5.0 grams of PFA. The previously described PEG diacid (twice by weight percent) is dissolved in 40 ml of dichloromethane along with 0.076 g of 4-dimethylaminopyridine (DMAP, Aldrich Chemical). The PEA and PEG diacid solutions were then mixed together and stirred overnight. The solution was dissolved in an excess of dichloromethane and filtered to remove a precipitate (dicyclohexylurea) from the reaction mixture. The filtrate was then evaporated to dryness and the residue recovered with acetone, filtered again and obtained by precipitation with excess ethanol.

In one particular group of experiments the block copolymer thus produced was pyrolyzed by heating in an inert atmosphere, and in that regard was raised from room temperature to 200° C. over a period of one hour, and heat soaked at 200° C. for two hours. The material was then ramped up to a temperature of 800° C. over four hours and heat soaked at 800° C. for eight hours, after which it was allowed to cool to room temperature.

It was found that materials thus produced had a pore size which depended upon the molecular weight of the PEG component. In general, the pore size tends to increase as the molecular weight of the PEG component increases; and by control of the molecular weight, the amount of microporosity and mesoporosity in the carbon can be easily tuned.

FIG. 1 is a graph showing pore size, in angstroms, as a function of pore volume in cubic centimeters per gram of three separate samples of porous carbon prepared in accord with the foregoing description. The carbon, in each case, was prepared from a block copolymer of polyfurfuryl alcohol and polyethylene glycol diacid. The molecular weight of the polyethylene glycol diacid component of the block copolymer was 2000, 3350, and 6000. As will be seen from the graph, the amount of microporosity and mesoporosity in the carbon may be easily tuned by varying the molecular weight of the polyethylene glycol diacid component.

While, as described above, porous carbon materials may be controllably prepared from block copolymer materials, in accord with another aspect of this invention it has been found that a similar high degree of control in the preparation of porous carbon materials may be achieved through the use of a mixture of a polyfurfuryl alcohol and polyethylene glycol diacid even though these materials are not incorporated into a block copolymer. This finding is surprising, given the fact that in the prior art it was generally known and believed that while porous carbon materials could be prepared from mixtures of discrete polymers, it was difficult to reliably control the pore structure of the resultant polymer materials. Hence, the finding that a good degree of control of pore structure could be achieved in a pyrolytic process for the fabrication of porous carbon materials from the starting mixture of discrete polyethylene glycol acid and polyfurfuryl alcohol was surprising and unexpected. In an experimental series, starting mixtures of the two polymers, in the same proportions as in the block copolymers described above, were prepared and pyrolyzed. A comparison series of mixtures were prepared utilizing polyfurfuryl alcohol and polyethylene glycol without the terminal diacid moieties. The results obtained, in terms of control of pore size, utilizing the polyethylene glycol diacid component, were comparable to those achieved through the use of the block copolymer material, and significantly better than results obtained utilizing mixture containing polyethylene glycol. While not wishing to be bound by speculation, it is believed that in the mixture including the polyethylene glycol diacid, there is more enthalpic interaction between the two polymers than there is in the mixture including polyethylene glycol. It is believed that the presence of the acidic end groups on the polyethylene glycol diacid is significant, and operates to influence the porosity of the carbon.

The present invention may be implemented in other modifications and variations. For example, carbonizing and pyrolyzing polymers other than those described hereinabove may be utilized either in block copolymer form, or as appropriately interacting mixtures, to form the carbon materials of the present invention. Some other polymeric materials which may be employed as one or more of the components of the starting mixture of the present invention comprise polyvinylidenes, particularly polyvinylidene halides such as polyvinylidene fluoride and polyvinylidene chloride. Carbohydrates such as long chain sugars and starches as well as polysaccharides, such as sucrose, may also be utilized as a component of a starting mixture of the present invention. Yet other components, reaction mixtures and reaction conditions will be apparent to those of skill in the art in view of the teaching presented herein. The foregoing discussion and description is illustrative of specific embodiments of the invention, but is not meant to be a limitation upon the practice thereof. It is the following claims, including all equivalents, which define the scope of the invention.

The invention claimed is:

1. A method for fabricating a carbon-based material having a controlled pore structure, said method comprising the steps of:
   providing a starting material which comprises a block copolymer, said copolymer being comprised of a first polymeric material which is a carbonizing polymer and a second polymeric material which is a pyrolyzing polymer, said block copolymer including at least one material from the group consisting of: polyvinylidene fluoride, polyfurfuryl alcohol, polyethylene glycol, and a carbohydrate; and
   pyrolyzing said starting material whereby said starting material undergoes a reaction-induced phase separation so as to produce a porous carbon material.

2. The method of claim 1, wherein said carbonizing polymer is a polyfurfuryl alcohol.

3. The method of claim 1, wherein said pyrolyzing polymer is a polyethylene glycol.

4. The method of claim 3, wherein said polyethylene glycol has a molecular weight in the range of 1,000-10,000.

5. The method of claim 3, wherein said polyethylene glycol is polyethylene glycol diacid.

6. The method of claim 1, wherein said step of pyrolyzing comprises heating said starting material at a temperature in the range of 500-1000° C. for a period of time in range of 5-20 hours.

7. The method of claim 1, wherein the step of pyrolyzing comprises heating said starting material to a temperature of 200° C. over a 1 hour time period, then raising the temperature of said starting material to 800° C. over a period of 4 hours, and then maintaining said starting material at 800° C. for 8 hours.

8. The method of claim 1, wherein said step of pyrolyzing is carried out in an inert atmosphere.

9. The method of claim 1, wherein said starting material is disposed upon a substrate prior to said step of pyrolyzing.

10. The method of claim 1, including the further step of heating the porous carbon material produced in the step of pyrolyzing the starting material, so as to activate said porous carbon material.

11. The material of claim 10, wherein said step of heating is carried out in an atmosphere consisting essentially of an inert gas and/or carbon dioxide.

12. The method of claim 10, wherein said step of heating is carried out in an atmosphere which comprises carbon dioxide.

\* \* \* \* \*